US008160815B2

(12) United States Patent
Geelen

(10) Patent No.: US 8,160,815 B2
(45) Date of Patent: Apr. 17, 2012

(54) NAVIGATION DEVICE AND METHOD FOR INFORMATIONAL SCREEN DISPLAY

(75) Inventor: Pieter Geelen, Amsterdam (NL)

(73) Assignee: Tomtom International B.V., Amsterdam (NL)

( * ) Notice: Subject to any disclaimer, the term of this patent is extended or adjusted under 35 U.S.C. 154(b) by 847 days.

(21) Appl. No.: 11/907,235

(22) Filed: Oct. 10, 2007

(65) Prior Publication Data

US 2008/0228385 A1      Sep. 18, 2008

Related U.S. Application Data

(60) Provisional application No. 60/879,523, filed on Jan. 10, 2007, provisional application No. 60/879,549, filed on Jan. 10, 2007, provisional application No. 60/879,553, filed on Jan. 10, 2007, provisional application No. 60/879,577, filed on Jan. 10, 2007, provisional application No. 60/879,599, filed on Jan. 10, 2007, provisional application No. 60/879,529, filed on Jan. 10, 2007.

(51) Int. Cl.
*G01C 21/00* (2006.01)
(52) U.S. Cl. ........................................ 701/410; 701/426
(58) Field of Classification Search .................. 701/200, 701/410, 426; 340/539.13, 995.24, 995.25
See application file for complete search history.

(56) References Cited

U.S. PATENT DOCUMENTS

| 6,208,934 | B1 | 3/2001 | Bechtolsheim et al. |
| 6,286,798 | B1 | 9/2001 | Chun |
| 6,321,158 | B1 | 11/2001 | DeLorme et al. |
| 6,640,185 | B2 | 10/2003 | Yokota et al. |
| 6,687,613 | B2 | 2/2004 | Yokota |
| 6,735,516 | B1 * | 5/2004 | Manson ........................ 701/209 |
| 6,810,323 | B1 | 10/2004 | Bullock et al. |

(Continued)

FOREIGN PATENT DOCUMENTS

DE    103 02 924 B3    4/2004

(Continued)

OTHER PUBLICATIONS

International Search Report dated Feb. 6, 2008 from International Patent Application PCT/EP2007/009167.

(Continued)

*Primary Examiner* — Mark Hellner

(57) ABSTRACT

A method and device are disclosed for navigation. In at least one embodiment, the method includes displaying a plurality of selectable point of interest entries on an integrated input and display of a navigation device; and displaying, upon receipt of an indication of a selection of one of the point of interest entries, an informational screen including display of a location of the selected point of interest entry relative to a current location of the navigation device, at least a phone number of the selected point of interest entry, and a prompt to dial the phone number of the selected point of interest entry. In at least one other embodiment of the present application, a device includes an integrated input and display device to display a plurality of selectable point of interest entries; and a processor to receive an indication of selection one of the point of interest entries, the integrated input and display device being further useable to display, upon the receipt of an indication of a selection of one of the point of interest entries by the processor, an informational screen including display of a location of the selected point of interest entry relative to a current location of the navigation device, at least a phone number of the selected point of interest entry, and a prompt to dial the phone number of the selected point of interest entry.

13 Claims, 20 Drawing Sheets

U.S. PATENT DOCUMENTS

| | | |
|---|---|---|
| 6,889,137 B1 | 5/2005 | Rychlak |
| 7,646,296 B2 * | 1/2010 | Ohki ........................ 340/539.13 |
| 7,711,472 B2 | 5/2010 | Finn et al. |
| 7,974,777 B2 | 7/2011 | Deurwaarder et al. |
| 2002/0013815 A1 | 1/2002 | Obradovich et al. |
| 2003/0210806 A1 | 11/2003 | Yoichi et al. |
| 2004/0070602 A1 | 4/2004 | Kobuya et al. |
| 2004/0236504 A1 | 11/2004 | Bickford et al. |
| 2004/0243307 A1 | 12/2004 | Geelen |
| 2005/0251331 A1 | 11/2005 | Kreft |
| 2005/0251334 A1 | 11/2005 | Finn et al. |
| 2006/0199612 A1 | 9/2006 | Beyer, Jr. |
| 2006/0200309 A1 | 9/2006 | Yu et al. |
| 2006/0250578 A1 | 11/2006 | Pohl et al. |
| 2006/0253247 A1 * | 11/2006 | de Silva et al. ............... 701/201 |
| 2007/0050128 A1 * | 3/2007 | Lee et al. ...................... 701/200 |
| 2007/0174042 A1 | 7/2007 | Thompson |
| 2007/0203642 A1 * | 8/2007 | Arnold-Huyser ............. 701/211 |
| 2008/0082262 A1 * | 4/2008 | Silva et al. ................... 701/211 |
| 2008/0167797 A1 | 7/2008 | Geelen et al. |
| 2008/0167799 A1 | 7/2008 | Geelen |
| 2008/0167800 A1 | 7/2008 | Geelen et al. |
| 2008/0167801 A1 | 7/2008 | Geelen et al. |
| 2008/0167803 A1 | 7/2008 | Gretton |
| 2008/0167810 A1 | 7/2008 | Wildervanck |
| 2008/0167812 A1 | 7/2008 | Geelen |
| 2008/0167813 A1 | 7/2008 | Geelen et al. |
| 2008/0168346 A1 | 7/2008 | Geelen et al. |
| 2008/0168398 A1 | 7/2008 | Geelen et al. |
| 2008/0207116 A1 | 8/2008 | Geelen et al. |
| 2008/0208446 A1 | 8/2008 | Geelen et al. |
| 2008/0208447 A1 | 8/2008 | Geelen et al. |
| 2008/0208448 A1 | 8/2008 | Geelen et al. |
| 2008/0215238 A1 | 9/2008 | Geelen et al. |
| 2008/0221782 A1 | 9/2008 | Deurwaarder et al. |
| 2008/0228390 A1 | 9/2008 | Geelen et al. |
| 2008/0262715 A1 | 10/2008 | Geelen et al. |
| 2010/0094536 A1 * | 4/2010 | Lee et al. ...................... 701/201 |
| 2010/0184453 A1 * | 7/2010 | Ohki .......................... 455/456.3 |
| 2010/0286901 A1 | 11/2010 | Geelen et al. |

FOREIGN PATENT DOCUMENTS

| | | |
|---|---|---|
| EP | 1 788 495 | 5/2007 |

OTHER PUBLICATIONS

International Search Report dated Feb. 29, 2008 from International Patent Application PCT/EP2007/008745.

International Search Report dated Jan. 30, 2008 from International Patent Application PCT/EP2007/008714.

* cited by examiner ns and Methods
NAVIGATION DEVICE AND METHOD FOR INFORMATIONAL SCREEN DISPLAY

PRIORITY STATEMENT

The present application hereby claims priority under 35 U.S.C. §119(e) on each of U.S. Provisional Patent Application Nos. 60/879,523 filed Jan. 10, 2007, 60/879,549 filed Jan. 10, 2007, 60/879,553 filed Jan. 10, 2007, 60/879,577 filed Jan. 10, 2007, 60/879,599 filed Jan. 10, 2007, and 60/879,529 filed Jan. 10, 2007, the entire contents of each of which is hereby incorporated herein by reference.

CO-PENDING APPLICATIONS

The following applications are being filed concurrently with the present application. The entire contents of each of the following applications is hereby incorporated herein by reference: A NAVIGATION DEVICE AND METHOD FOR EARLY INSTRUCTION OUTPUT (application Ser. No. 11/907,229) filed on even date herewith; A NAVIGATION DEVICE AND METHOD FOR ESTABLISHING AND USING PROFILES (application Ser. No. 11/907,230) filed on even date herewith; A NAVIGATION DEVICE AND METHOD FOR ENHANCED MAP DISPLAY (application Ser. No. 11/907,231) filed on even date herewith; A NAVIGATION DEVICE AND METHOD RELATING TO AN AUDIBLE RECOGNITION MODE (application Ser. No. 11/907,232) filed on even date herewith; NAVIGATION DEVICE AND METHOD FOR PROVIDING POINTS OF INTEREST (Application Ser. No. 11/907,233) filed on even date herewith; A NAVIGATION DEVICE AND METHOD FOR FUEL PRICING DISPLAY (application Ser. No. 11/907,234) filed on even date herewith; A NAVIGATION DEVICE AND METHOD FOR DEALING WITH LIMITED ACCESS ROADS (application Ser. No. 11/907,243) filed on even date herewith; A NAVIGATION DEVICE AND METHOD FOR TRAVEL WARNINGS (application Ser. No. 11/907,244) filed on even date herewith; A NAVIGATION DEVICE AND METHOD FOR DRIVING BREAK WARNING (application Ser. No. 11/907,227) filed on even date herewith; A NAVIGATION DEVICE AND METHOD FOR ISSUING WARNINGS (application Ser. No. 11/907,242) filed on even date herewith; A NAVIGATION DEVICE AND METHOD FOR DISPLAY OF POSITION IN TEXT READABLE FORM (application Ser. No. 11/907,241) filed on even date herewith; A NAVIGATION DEVICE AND METHOD FOR EMERGENCY SERVICE ACCESS (application Ser. No. 11/907,228) filed on even date herewith; A NAVIGATION DEVICE AND METHOD FOR PROVIDING REGIONAL TRAVEL INFORMATION IN A NAVIGATION DEVICE (application Ser. No. 11/907,240) filed on even date herewith; A NAVIGATION DEVICE AND METHOD FOR USING SPECIAL CHARACTERS IN A NAVIGATION DEVICE (application Ser. No. 11/907,239) filed on even date herewith; A NAVIGATION DEVICE AND METHOD USING A PERSONAL AREA NETWORK (application Ser. No. 11/907,238) filed on even date herewith; A NAVIGATION DEVICE AND METHOD USING A LOCATION MESSAGE (application Ser. No. 11/907,237) filed on even date herewith; NAVIGATION DEVICE AND METHOD FOR CONSERVING POWER (Ser. No. 11/907,236) filed on even date herewith; A NAVIGATION DEVICE AND METHOD FOR USING A TRAFFIC MESSAGE CHANNEL (application Ser. No. 11/907,253) filed on even date herewith; A NAVIGATION DEVICE AND METHOD FOR USING A TRAFFIC MESSAGE CHANNEL RESOURCE (application Ser. No. 11/907,252) filed on even date herewith; A NAVIGATION DEVICE AND METHOD FOR QUICK OPTION ACCESS (application Ser. No. 11/907,251) filed on even date herewith; A NAVIGATION DEVICE AND METHOD FOR DISPLAYING A RICH CONTENT DOCUMENT (application Ser. No. 11/907,257) filed on even date herewith.

FIELD

The present application generally relates to navigation methods and devices.

BACKGROUND

Navigation devices were traditionally utilized mainly in the areas of vehicle use, such as on cars, motorcycles, trucks, boats, etc. Alternatively, if such navigation devices were portable, they were further transferable between vehicles and/or useable outside the vehicle, for foot travel for example.

These devices are typically tailored to produce a route of travel based upon an initial position of the navigation device and a selected/input travel destination (end position), noting that the initial position could be entered into the device, but is traditionally calculated via GPS Positioning from a GPS receiver within the navigation device.

In known navigation systems, menus are used to display various travel destinations, desired locations, and desired points of interest. A user, for example, can select a category of restaurants as a point of interest, and can find a plurality of selections available. The user can then select a particular restaurant and then determine a route to that restaurant using the navigation system.

SUMMARY

The inventors discovered that although a plurality of selectable various travel destinations or locations were displayed in known navigation systems under desired points of interest, listing a plurality of entries for example in various selectable categories, only limited information was conveyed to the user. Thus, the inventors developed informational screens and informational symbols to convey more information regarding points of interest to the user in an efficient manner.

In at least one embodiment of the present application, a method includes prompting selection of one of a plurality of point of interest icons on an integrated input and display device of a navigation device; displaying a plurality of selectable point of interest entries on the navigation device in response to receipt of an indication of selection one of the icons; and displaying, upon receipt of an indication of selection of one of the point of interest entries, an informational screen regarding the selected point of interest entry, including at least a name and a phone number of the selected point of interest entry, along with a prompt to dial the phone number of the selected point of interest entry.

In at least one embodiment of the present application, a navigation device includes an integrated input and display device to display a plurality of selectable point of interest icons; and a processor to receive an indication of selection one of the icons, the integrated input and display device being further useable to display a plurality of selectable point of interest entries in response to the processor receiving an indication of selection one of the icons, and upon the processor receiving an indication of selection of one of the point of interest entries, the integrated input and display device being further useable to display an informational screen regarding the selected point of interest entry including at least a name and a phone number of the selected point of interest entry, along with a prompt to dial the phone number of the selected point of interest entry.

In at least one other embodiment of the present application, a method includes displaying a plurality of selectable point of interest entries on an integrated input and display device of a navigation device; and displaying, upon receipt of an indication of a selection of one of the point of interest entries, an informational screen including display of a location of the selected point of interest entry relative to a current route of travel of the navigation device, at least a phone number of the selected point of interest entry, and a prompt to dial the phone number of the selected point of interest entry.

In at least one other embodiment of the present application, a device includes an integrated input and display device to display a plurality of selectable point of interest entries; and a processor to receive an indication of selection one of the point of interest entries, the integrated input and display device being further useable to display, upon the receipt of an indication of a selection of one of the point of interest entries by the processor, an informational screen including display of a location of the selected point of interest entry relative to a current route of travel of the navigation device, at least a phone number of the selected point of interest entry, and a prompt to dial the phone number of the selected point of interest entry.

BRIEF DESCRIPTION OF THE DRAWINGS

The present application will be described in more detail below by using example embodiments, which will be explained with the aid of the drawings, in which.

DETAILED DESCRIPTION OF THE EXAMPLE EMBODIMENTS

Figure 1:
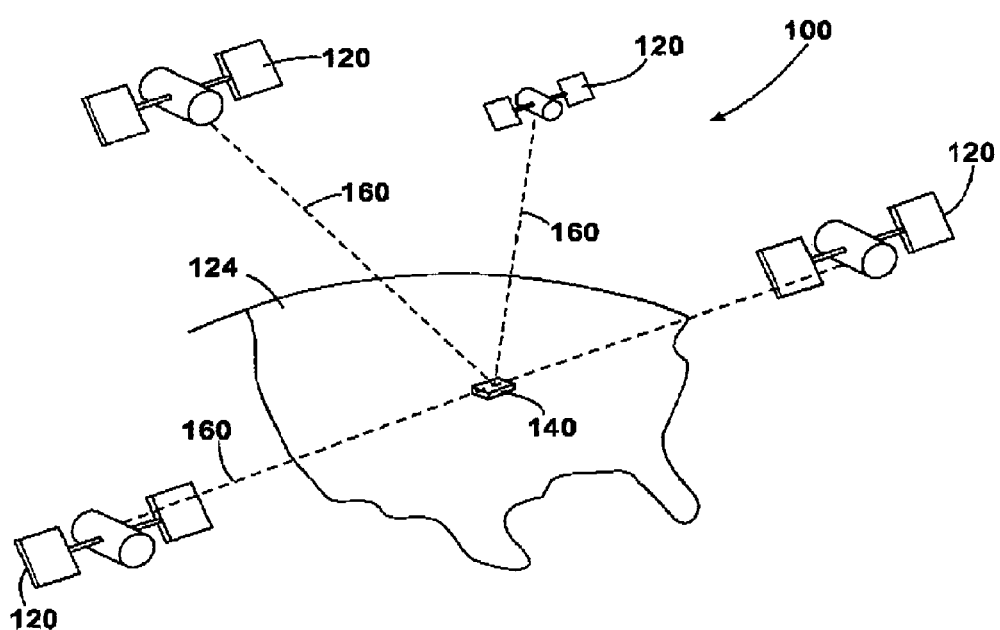
FIG. 1 illustrates an example view of a Global Positioning System (GPS)

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the term "and/or" includes any and all combinations of one or more of the associated listed items.

FIG. 1 illustrates an example view of Global Positioning System (GPS), usable by navigation devices, including the navigation device of embodiments of the present application. Such systems are known and are used for a variety of purposes. In general, GPS is a satellite-radio based navigation system capable of determining continuous position, velocity, time, and in some instances direction information for an unlimited number of users.

Formerly known as NAVSTAR, the GPS incorporates a plurality of satellites which work with the earth in extremely precise orbits. Based on these precise orbits, GPS satellites can relay their location to any number of receiving units.

The GPS system is implemented when a device, specially equipped to receive GPS data, begins scanning radio frequencies for GPS satellite signals. Upon receiving a radio signal from a GPS satellite, the device determines the precise location of that satellite via one of a plurality of different conventional methods. The device will continue scanning, in most instances, for signals until it has acquired at least three different satellite signals (noting that position is not normally, but can be determined, with only two signals using other triangulation techniques). Implementing geometric triangulation, the receiver utilizes the three known positions to determine its own two-dimensional position relative to the satellites. This can be done in a known manner. Additionally, acquiring a fourth satellite signal will allow the receiving device to calculate its three dimensional position by the same geometrical calculation in a known manner. The position and velocity data can be updated in real time on a continuous basis by an unlimited number of users.

As shown in FIG. 1, the GPS system is denoted generally by reference numeral 100. A plurality of satellites 120 are in orbit about the earth 124. The orbit of each satellite 120 is not necessarily synchronous with the orbits of other satellites 120 and, in fact, is likely asynchronous. A GPS receiver 140, usable in embodiments of navigation devices of the present application, is shown receiving spread spectrum GPS satellite signals 160 from the various satellites 120.

The spread spectrum signals 160, continuously transmitted from each satellite 120, utilize a highly accurate frequency standard accomplished with an extremely accurate atomic clock. Each satellite 120, as part of its data signal transmission 160, transmits a data stream indicative of that particular satellite 120. It is appreciated by those skilled in the relevant art that the GPS receiver device 140 generally acquires spread spectrum GPS satellite signals 160 from at least three satellites 120 for the GPS receiver device 140 to calculate its two-dimensional position by triangulation. Acquisition of an additional signal, resulting in signals 160 from a total of four satellites 120, permits the GPS receiver device 140 to calculate its three-dimensional position in a known manner.

Figure 2:
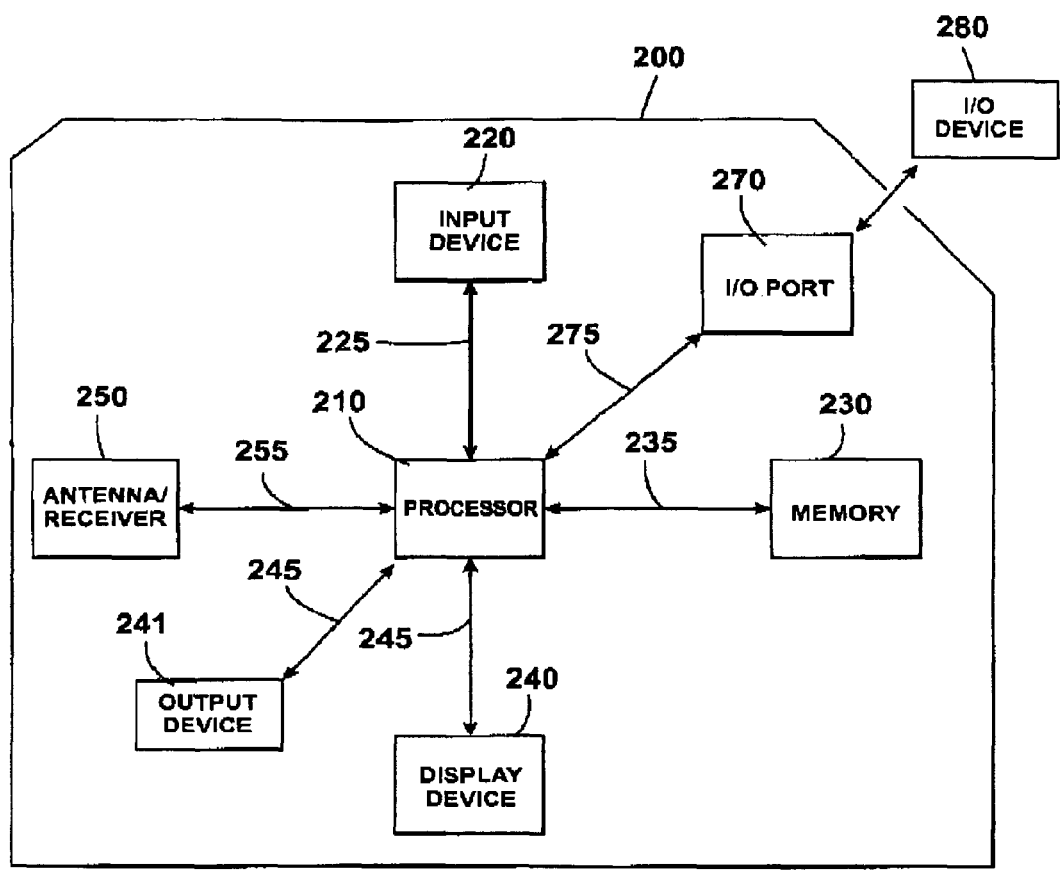
FIG. 2 illustrates an example block diagram of electronic components of a navigation device of an embodiment of the present application.

FIG. 2 illustrates an example block diagram of electronic components of a navigation device 200 of an embodiment of the present application, in block component format. It should be noted that the block diagram of the navigation device 200 is not inclusive of all components of the navigation device, but is only representative of many example components.

The navigation device 200 is located within a housing (not shown). The housing includes a processor 210 connected to an input device 220 and a display screen 240. The input device 220 can include a keyboard device, voice input device, touch panel and/or any other known input device utilized to input information; and the display screen 240 can include any type of display screen such as an LCD display, for example. In at least one embodiment of the present application, the input device 220 and display screen 240 are integrated into an integrated input and display device, including a touchpad or touchscreen input wherein a user need only touch a portion of the display screen 240 to select one of a plurality of display choices or to activate one of a plurality of virtual buttons.

In addition, other types of output devices 250 can also include, including but not limited to, an audible output device. As output device 250 can produce audible information to a user of the navigation device 200, it is equally understood that input device 240 can also include a microphone and software for receiving input voice commands as well.

In the navigation device 200, processor 210 is operatively connected to and set to receive input information from input device 240 via a connection 225, and operatively connected to at least one of display screen 240 and output device 250, via output connections 245, to output information thereto. Further, the processor 210 is operatively connected to memory 230 via connection 235 and is further adapted to receive/send information from/to input/output (I/O) ports 270 via connection 275, wherein the I/O port 270 is connectible to an I/O device 280 external to the navigation device 200. The external I/O device 270 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the navigation device 200 and the internet or any other network for example, and/or to establish a connection to a server via the internet or some other network for example.

The navigation device 200, in at least one embodiment, may establish a "mobile" network connection with the server 302 via a mobile device 400 (such as a mobile phone, PDA, and/or any device with mobile phone technology) establishing a digital connection (such as a digital connection via known Bluetooth technology for example). Thereafter, through its network service provider, the mobile device 400 can establish a network connection (through the internet for example) with a server 302. As such, a "mobile" network connection is established between the navigation device 200 (which can be, and often times is mobile as it travels alone and/or in a vehicle) and the server 302 to provide a "real-time" or at least very "up to date" gateway for information.

The establishing of the network connection between the mobile device 400 (via a service provider) and another device such as the server 302, using the internet 410 for example, can be done in a known manner. This can include use of TCP/IP layered protocol for example. The mobile device 400 can utilize any number of communication standards such as CDMA, GSM, WAN, etc.

As such, an internet connection may be utilized which is achieved via data connection, via a mobile phone or mobile phone technology within the navigation device 200 for example. For this connection, an internet connection between the server 302 and the navigation device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet.

The navigation device 200 can further complete a data connection with the mobile device 400, and eventually with the internet 410 and server 302, via existing Bluetooth technology for example, in a known manner, wherein the data protocol can utilize any number of standards, such as the GSRM, the Data Protocol Standard for the GSM standard, for example.

The navigation device 200 may include its own mobile phone technology within the navigation device 200 itself (including an antenna for example, wherein the internal antenna of the navigation device 200 can further alternatively be used). The mobile phone technology within the navigation device 200 can include internal components as specified above, and/or can include an insertable card, complete with necessary mobile phone technology and/or an antenna for example. As such, mobile phone technology within the navigation device 200 can similarly establish a network connection between the navigation device 200 and the server 302, via the internet 410 for example, in a manner similar to that of any mobile device 400.

For GRPS phone settings, the Bluetooth enabled device may be used to correctly work with the ever changing spectrum of mobile phone models, manufacturers, etc., model/manufacturer specific settings may be stored on the navigation device 200 for example. The data stored for this information can be updated in a manner discussed in any of the embodiments, previous and subsequent.

FIG. 2 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 2 are powered by power sources (not shown) in a conventional manner. As will be understood by one of ordinary skill in the art, different configurations of the components shown in FIG. 2 are considered within the scope of the present application. For example, in one embodiment, the components shown in FIG. 2 may be in communication with one another via wired and/or wireless connections and the like. Thus, the scope of the navigation device 200 of the present application includes a portable or handheld navigation device 200.

In addition, the portable or handheld navigation device 200 of FIG. 2 can be connected or "docked" in a known manner to a motorized vehicle such as a car or boat for example. Such a navigation device 200 is then removable from the docked location for portable or handheld navigation use.

Figure 3:
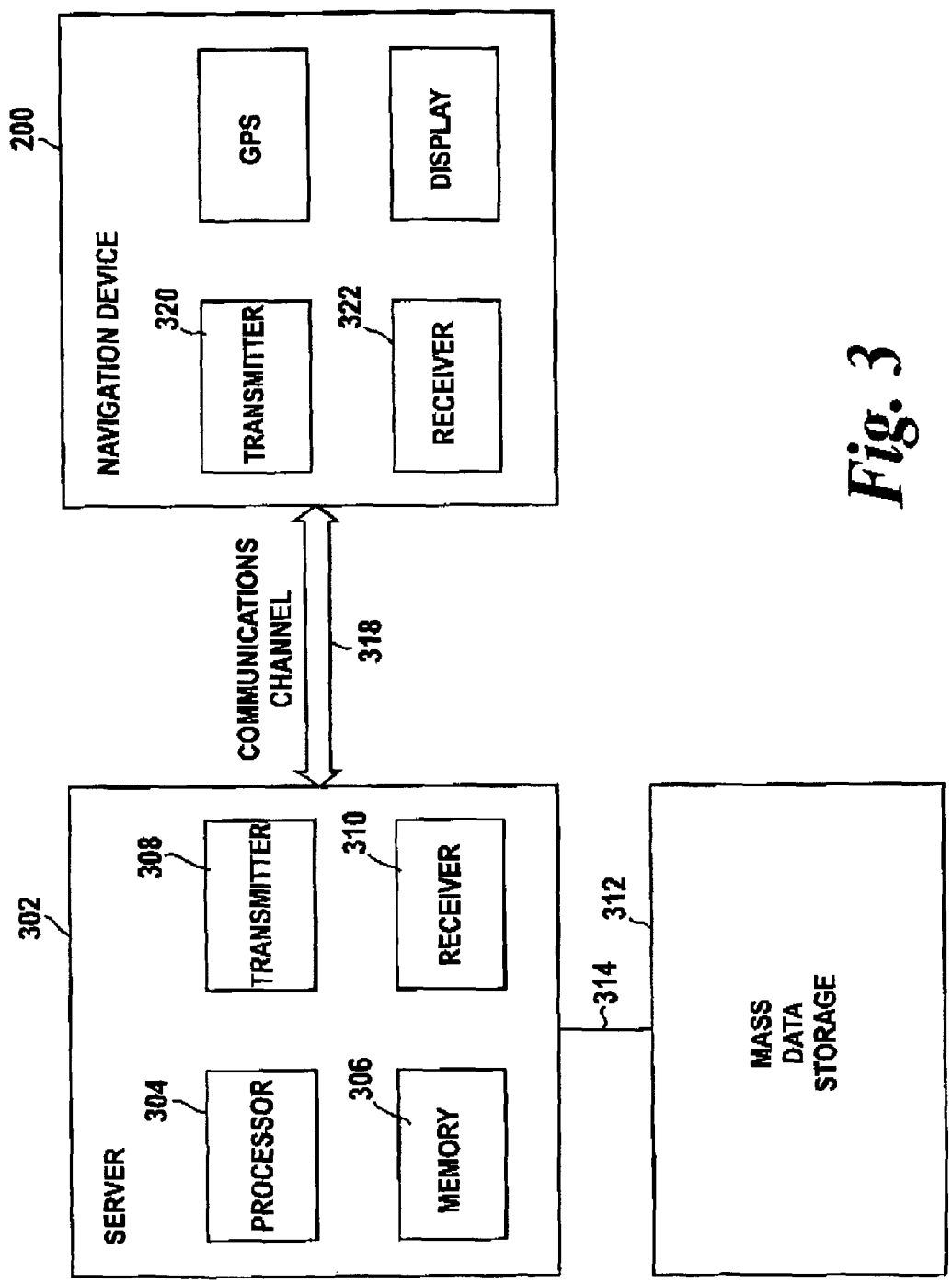
FIG. 3 illustrates an example block diagram of a server, navigation device and connection therebetween of an embodiment of the present application.

FIG. 3 illustrates an example block diagram of a server 302 and a navigation device 200 of the present application, via a generic communications channel 318, of an embodiment of the present application. The server 302 and a navigation device 200 of the present application can communicate when a connection via communications channel 318 is established between the server 302 and the navigation device 200 (noting that such a connection can be a data connection via mobile device, a direct connection via personal computer via the internet, etc.).

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from navigation device 200 via communications channel 318. The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a signal transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The navigation device 200 is adapted to communicate with the server 302 through communications channel 318, and includes processor, memory, etc. as previously described with regard to FIG. 2, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the navigation device 200 and the functions of the transmitter 320 and receiver 322 may be combined into a single transceiver.

Software stored in server memory 306 provides instructions for the processor 304 and allows the server 302 to provide services to the navigation device 200. One service provided by the server 302 involves processing requests from the navigation device 200 and transmitting navigation data from the mass data storage 312 to the navigation device 200. According to at least one embodiment of the present application, another service provided by the server 302 includes processing the navigation data using various algorithms for a desired application and sending the results of these calculations to the navigation device 200.

The communication channel 318 generically represents the propagating medium or path that connects the navigation device 200 and the server 302. According to at least one embodiment of the present application, both the server 302 and navigation device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, according to at least one embodiment, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (rf) waves, the atmosphere, empty space, etc. Furthermore, according to at least one various embodiment, the communication channel 318 can include intermediate devices such as routers, repeaters, buffers, transmitters, and receivers, for example.

In at least one embodiment of the present application, for example, the communication channel 318 includes telephone and computer networks. Furthermore, in at least one embodiment, the communication channel 318 may be capable of accommodating wireless communication such as radio frequency, microwave frequency, infrared communication, etc. Additionally, according to at least one embodiment, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), Global System for Mobile Communications (GSM), etc. Both digital and analogue signals can be transmitted through the communication channel 318. According to at least one embodiment, these signals may be modulated, encrypted and/or compressed signals as may be desirable for the communication technology.

The mass data storage 312 includes sufficient memory for the desired navigation applications. Examples of the mass data storage 312 may include magnetic data storage media such as hard drives for example, optical storage media such as CD-Roms for example, charged data storage media such as flash memory for example, molecular memory, etc.

According to at least one embodiment of the present application, the server 302 includes a remote server accessible by the navigation device 200 via a wireless channel. According to at least one other embodiment of the application, the server 302 may include a network server located on a local area network (LAN), wide area network (WAN), virtual private network (VPN), etc.

According to at least one embodiment of the present application, the server 302 may include a personal computer such as a desktop or laptop computer, and the communication channel 318 may be a cable connected between the personal computer and the navigation device 200. Alternatively, a personal computer may be connected between the navigation device 200 and the server 302 to establish an internet connection between the server 302 and the navigation device 200. Alternatively, a mobile telephone or other handheld device may establish a wireless connection to the internet, for connecting the navigation device 200 to the server 302 via the internet.

The navigation device 200 may be provided with information from the server 302 via information downloads which may be periodically updated upon a user connecting navigation device 200 to the server 302 and/or may be more dynamic upon a more constant or frequent connection being made between the server 302 and navigation device 200 via a wireless mobile connection device and TCP/IP connection for example. For many dynamic calculations, the processor 304 in the server 302 may be used to handle the bulk of the processing needs, however, processor 210 of navigation device 200 can also handle much processing and calculation, oftentimes independent of a connection to a server 302.

The mass storage device 312 connected to the server 302 can include volumes more cartographic and route data than that which is able to be maintained on the navigation device 200 itself, including maps, etc. The server 302 may process, for example, the majority of the devices of a navigation device 200 which travel along the route using a set of processing algorithms. Further, the cartographic and route data stored in memory 312 can operate on signals (e.g. GPS signals), originally received by the navigation device 200.

As indicated above in FIG. 2 of the application, a navigation device 200 of an embodiment of the present application includes a processor 210, an input device 220, and a display screen 240. In at least one embodiment, the input device 220 and display screen 240 are integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the navigation device 200 can also include any additional input device 220 and/or any additional output device 240, such as audio input/output devices for example.

Figure 4A:
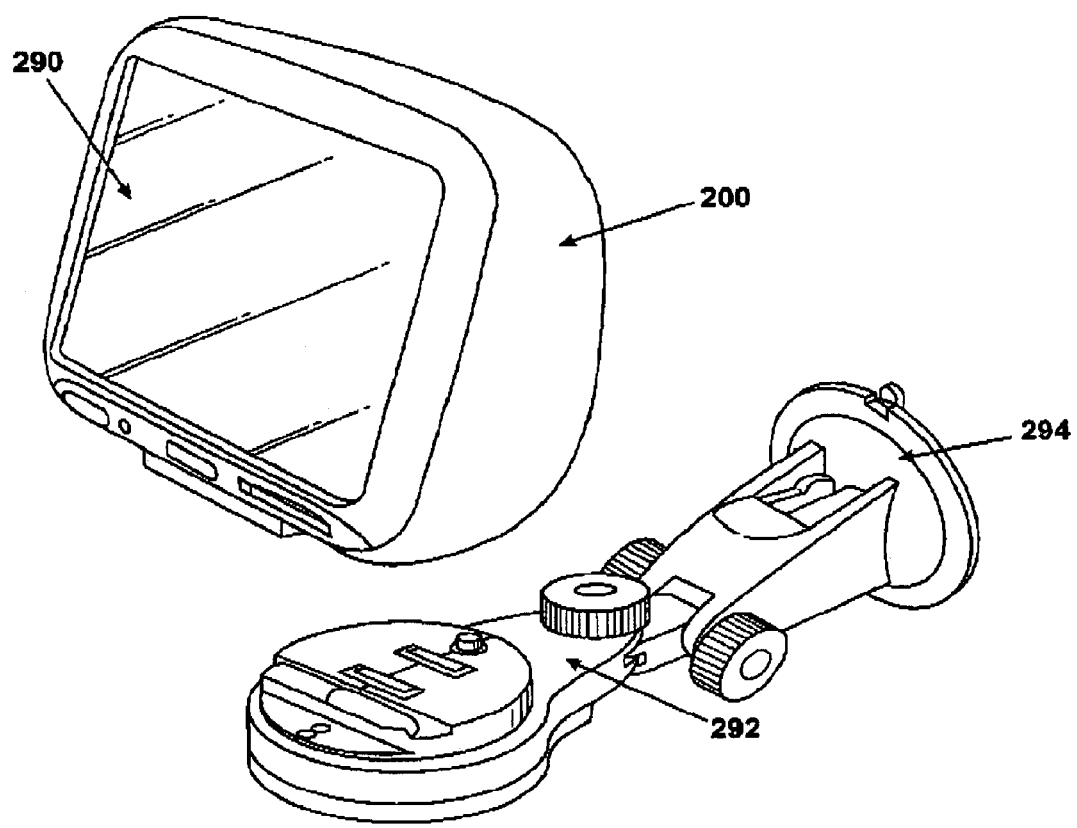
FIGS. 4A and 4B are perspective views of an implementation of an embodiment of the navigation device.
Figure 4B:
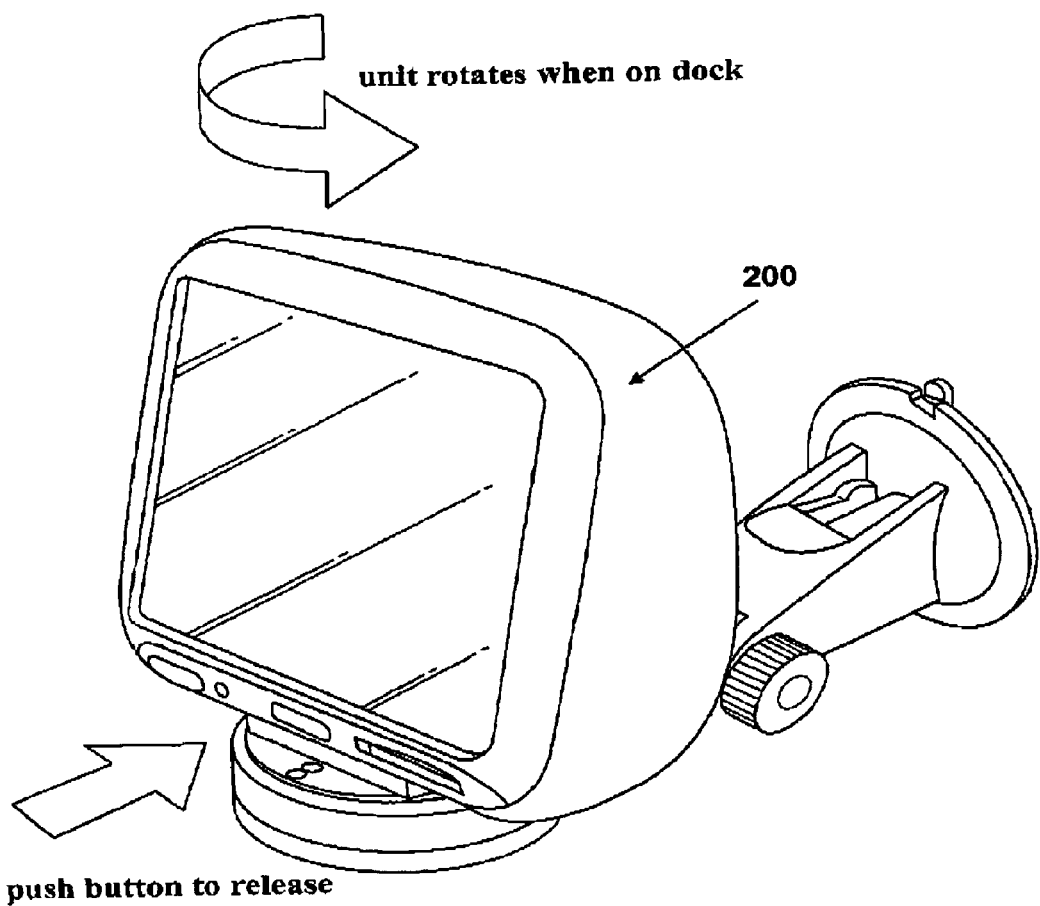

FIGS. 4A and 4B are perspective views of an implementation of an embodiment of the navigation device 200. As shown in FIG. 4A, the navigation device 200 may be a unit that includes an integrated input and display device 290 (a touch panel screen for example) and the other components of FIG. 2 (including but not limited to internal GPS receiver 250, microprocessor 210, a power supply, memory systems 220, etc.).

The navigation device 200 may sit on an arm 292, which itself may be secured to a vehicle dashboard/window/etc. using a large suction cup 294. This arm 292 is one example of a docking station to which the navigation device 200 can be docked.

As shown in FIG. 4B, the navigation device 200 can be docked or otherwise connected to an arm 292 of the docking station by snap connecting the navigation device 292 to the arm 292 for example (this is only one example, as other known alternatives for connection to a docking station are within the scope of the present application). The navigation device 200 may then be rotatable on the arm 292, as shown by the arrow of FIG. 4B. To release the connection between the navigation device 200 and the docking station, a button on the navigation device 200 may be pressed, for example (this is only one example, as other known alternatives for disconnection to a docking station are within the scope of the present application).

The inventors discovered that although a plurality of selectable various travel destinations or locations were displayed in known navigation systems under desired points of interest, listing a plurality of entries for example in various selectable categories, only limited information was conveyed to the user. Thus, the inventors developed informational screens and informational symbols to convey more information regarding points of interest to the user in an efficient manner.

In at least one embodiment of the present application, a method includes prompting selection of one of a plurality of point of interest icons on an integrated input and display device 290 of a navigation device 200; displaying a plurality of selectable point of interest entries on the navigation device 200 in response to receipt of an indication of selection one of the icons; and displaying, upon receipt of an indication of selection of one of the point of interest entries, an informational screen regarding the selected point of interest entry, including at least a name and a phone number of the selected point of interest entry, along with a prompt to dial the phone number of the selected point of interest entry.

In at least one embodiment of the present application, a navigation device 200 includes an integrated input and display device 290 to display a plurality of selectable point of interest icons; and a processor 210 to receive an indication of selection one of the icons, the integrated input and display device 290 being further useable to display a plurality of selectable point of interest entries in response to the processor 210 receiving an indication of selection one of the icons, and upon the processor 210 receiving an indication of selection of one of the point of interest entries, the integrated input and display device 290 being further useable to display an informational screen regarding the selected point of interest entry including at least a name and a phone number of the selected point of interest entry, along with a prompt to dial the phone number of the selected point of interest entry.

Figure 5:
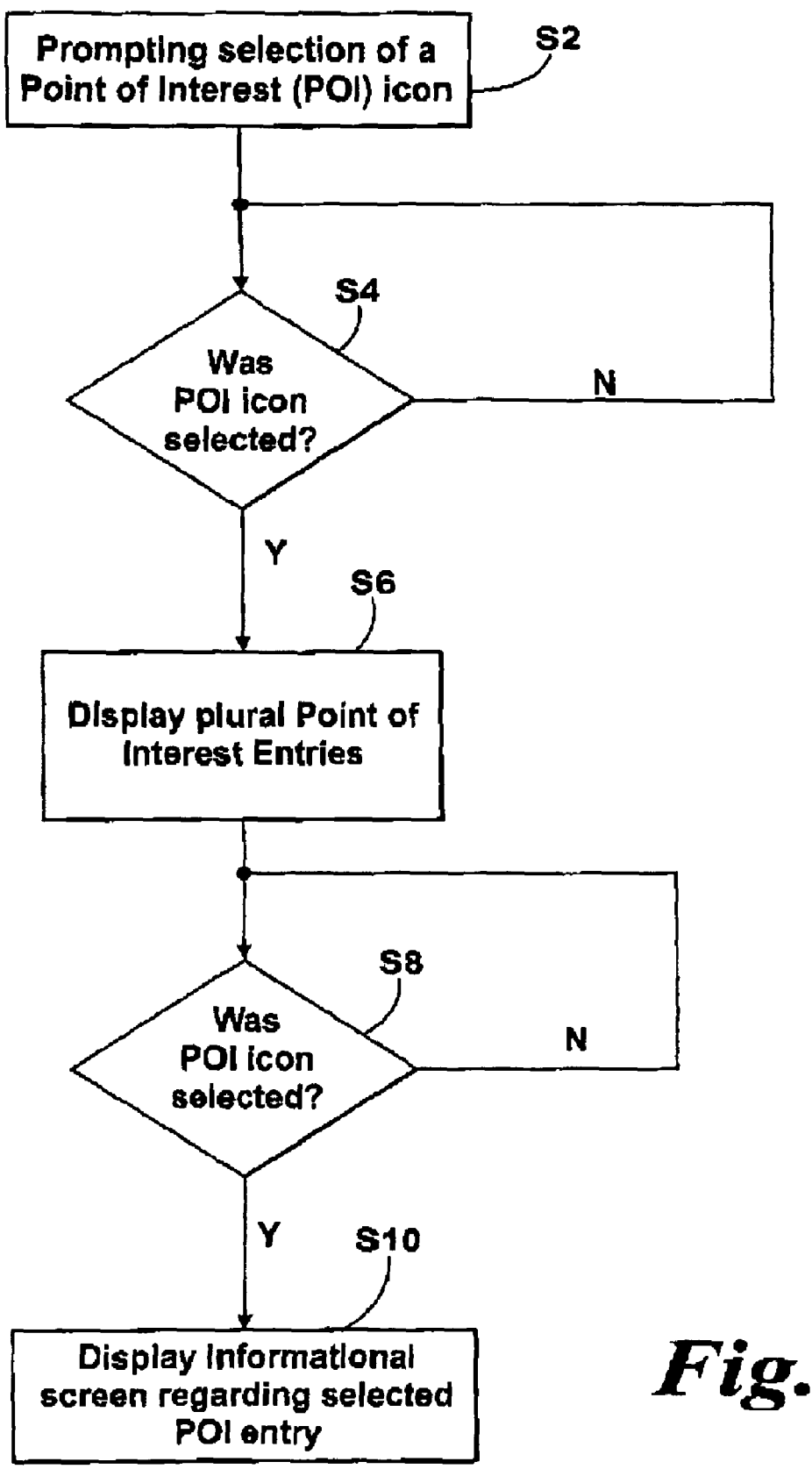
FIG. 5 illustrates a flow chart for an example embodiment of the present application.

FIG. 5 of the present application illustrates a flowchart of an example embodiment of a method of the present application. As shown in step S2, the process initially begins with prompting selection of a Point of Interest (POI) icon. This can be done, for example, through display on an integrated input and display device 290 of a navigation device 200. Examples of display screens prompting selection of Points of Interest icons are shown in FIGS. 6A and 6B for example.

Figure 6A:
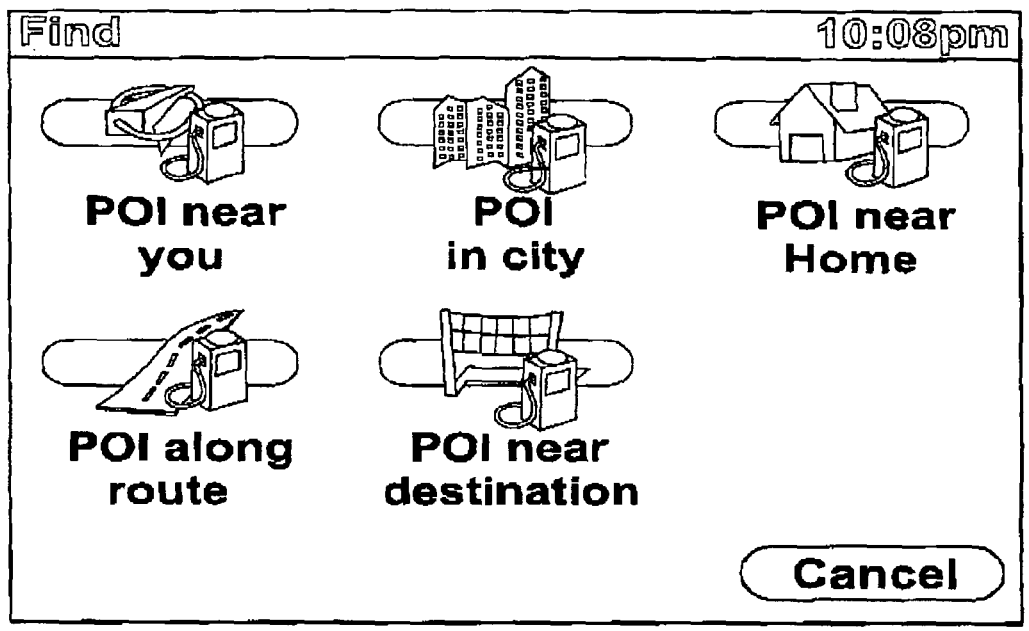
FIGS. 6A and 6B illustrate example display screens of an embodiment of the present application.
Figure 6B:
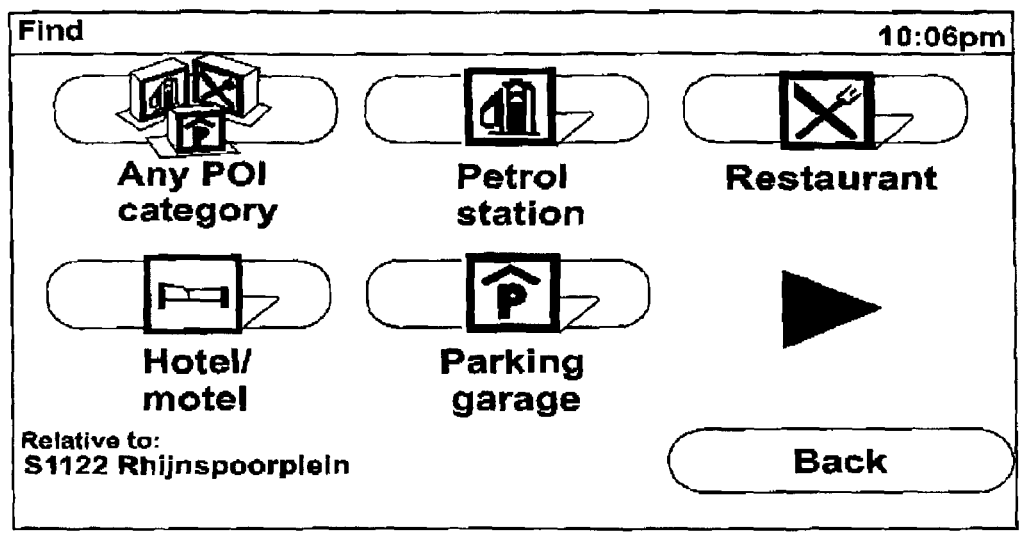

As shown in FIG. 6A, points of interest can be determined by a processor 210 in various known ways. For example, as shown in FIG. 6A, "POI near you" can provide Points of Interest near a current location of a navigation device 200, wherein a current location of a navigation device 200 can be determined by a received GPS signal for example, and Points of Interest, near, namely within a certain threshold distance, can be determined in a known manner by the processor 210 for example.

In the example shown in FIG. 6A, the various Points of Interest relate to the fuel station locations, as indicated by the fuel pump shown in connection with the other icons of FIG. 6A. For example, a user could first select the "petrol station" icon shown in FIG. 6B and then thereafter, could be presented with the display of FIG. 6A to select an icon relating to fuel or petrol stations near a location of the navigation device 200, in a particular city, near a home location of a navigation device 200, along a determined route of the navigation device 200, near a particular destination of the navigation device 200, etc. Accordingly, in the current example embodiment of the present application, locations of gas stations are being determined, but it should be noted that the present application may relate to any POI, and is not just limited to gas station locations.

After step S2, the process of FIG. 5 then proceeds to step S4, where it is determined whether or not a POI icon is selected. For example, in FIG. 6A, if the user of the navigation device 200 desires to find fuel station locations which are along or near a current route of travel of the navigation device 200, the user may select the "POI along route" icon. In response to receipt of an indication of selection of one of the icons by the processor 210 for example, the processor 210 can then control the integrated input and display device 290 for example, to display a plurality of selectable Point of Interest entries in step S6. One example of a display of entries is shown in FIG. 7 of the present application, wherein these entries are displayed upon receipt of the "POI along route" icon as shown in FIG. 6A of the present application.

Figure 7:
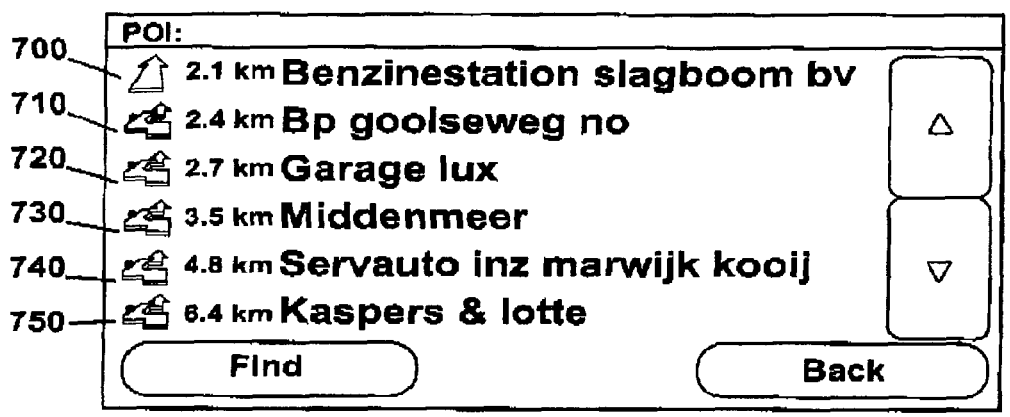
FIGS. 7, 8A-C, 9, 10A-C and 11A-C example display screens of an embodiment of the present application.

As shown in FIG. 7, the selectable Point of Interest (POI) entries may be displayed on an integrated input and display device 290 of the navigation device 200 in conjunction with distance information, wherein the distance information indicates a distance between a location related to the selectable Point of Interest entry and location of the navigation device 200 along a route of travel of the navigation device 200.

For example, the first entry of FIG. 7 is entitled "Benzinestation slagboom b v," and it is located 2.1 kilometers from a current location of the navigation device 200. Such distances can be determined by the processor 210 for example, comparing stored location information of the particular gas station to the current location of the navigation device 200, obtained based upon a GPS signal for example. The processor 210 can then compare this current location to a database stored in memory 230 for example, of gas stations, to find gas stations proximate to the route of travel of the navigation device 200 and can then determine and direct the integrated input and display device 290 to display distances from the current location of the navigation device 200 as shown in FIG. 7 for example.

In at least one embodiment of the present application, the distance may be measured from the position of the navigation device 200 on the travel route to a position on the travel route nearest to the poi. This can further include the distance that it will take to drive from the travel route to the poi. In such an instance, the distance would be driving distance over the roads to reach the poi.

An exception, in at least one embodiment, may be the icons with the biggest detour, (for example 710, 720, 730 and 750), where it may not have been confirmed that there is a connection by roads from the current travel route to the poi (the processor 210 may just have confirmed that the poi is in range of the travel route). In that case, the distance may be estimated by the processor 210 from the current position of the navigation device on the travel route to the position on the travel route nearest to the poi, plus an added distance between the travel route and the poi for example. This added distance may be the greater of the distance up to which the processor 210 searched for a route of travel from the travel route to the poi and a distance between the travel route and the poi in a straight line.

All other poi searches preferably list the distance to the poi in a straight line measured from the search point which is either the GPS current location (poi near you), the city center point (poi in city), your home position (poi near home), or the destination position (poi near destination). The route proximity icons (710-750) may be used to convey the second part of the distance component. This distance may only be added to the displayed distance in a poi along route search, for example.

The display of FIG. 7 can also include display of the selectable Points of Interest entries in conjunction with a symbol representative of proximity to a current route of travel of the navigation device 200. Such symbols are shown by elements 700, 710, 720, 730, 740, and 750 for example. The shape of the displayed symbol may be used to convey proximity to a current route of travel of the navigation device 200 for example, wherein the arrow 700 may be used to designate that the Point of Interest "Benzinestation slagboom b v" is along the current route of travel of the navigation device 200 (you do not have to leave the current route of travel), wherein the crooked arrows 710, 720, 730, 740 and 750 can be used to indicate that the corresponding Point of Interest entries are not along the current route of travel, and thus will require a detour.

In addition, color can be used to convey proximity to a current route of travel in the navigation device 200. For example, the fifth entry corresponding to the symbol 740, can have its symbol displayed in the first color such as green for example, to indicate that it is near the route of travel and can be located by only a small detour (for example, it may indicate that the processor 210 was actually able to find a route of travel from the current route of travel and within a distance/route length); wherein the third entry "Garage lux" can have its symbol 720 be displayed in a different color, such as a yellow color, to indicate that although it is near the route of travel, a larger detour is needed to reach its location (and/or can indicate that the processor 210 could not confirm a connection between the current route of travel and a route to the POI, within a threshold search distance for example). Thus, although the distance of the fifth entry corresponding to the symbol 740 is larger than the distance of the third entry of "Garage lux" corresponding to the symbol 720, the color of the symbol can be used to convey whether or not a large detour is needed or a small detour is needed for example, thereby conveying the proximity to a current route of travel of the navigation device 200, and not just proximity to a current location of the navigation device 200 itself.

It should be noted that the various information to be displayed in the display screen 7 may be determined by the processor 210 for example, wherein the processor can compare stored information for various Points of Interest within a selected category for example, to a current location of the navigation device 200 in a manner previously discussed. Further, the processor 210 can compare, for the entries relatively closest to the current location of the navigation device 200 for example, positions of the various entries relative to a current route of travel of the navigation device 200 to determine whether or not the location of the various Points of Interest entries are along the route of travel or not along the route of travel. As such, the processor 210 can direct display of the various symbols/icons 700, 710, 720, 730, 740, and 750 for example, based upon shape. In addition, color can be used to differentiate from various ones of the symbols/icons 710, 720, 730, 740, and 750, based upon whether or not a detour will have to be a large or small detour (compared in relation to a threshold for example) based upon the location of the route of travel of the navigation device 200, and not just based upon a current location of the navigation device 200. As such, symbols of different colors can be display in FIG. 7 for example, as directed by the processor 210.

Referring back to the process of FIG. 5, once a plurality of the Point of Interest entries are display in step S6, such as those shown in FIG. 7 for example, the processor 210 can then determine whether or not one of the Point of Interest entries has been selected in step S8. If not, it merely awaits for such a selection and if so, the processor 210 proceeds to step S10 wherein the processor 210 can direct the integrated input and display device 290 to display, upon receipt of an indication of selection of one of the Points of Interest entries, an informational screen regarding the selected Point of Interest entry.

Figure 8A:
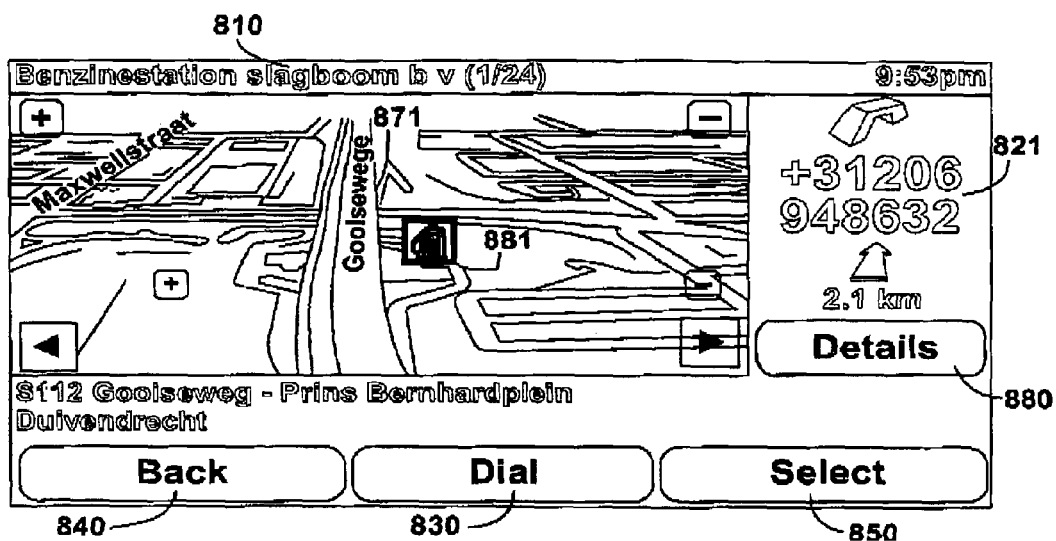
Figure 8B:
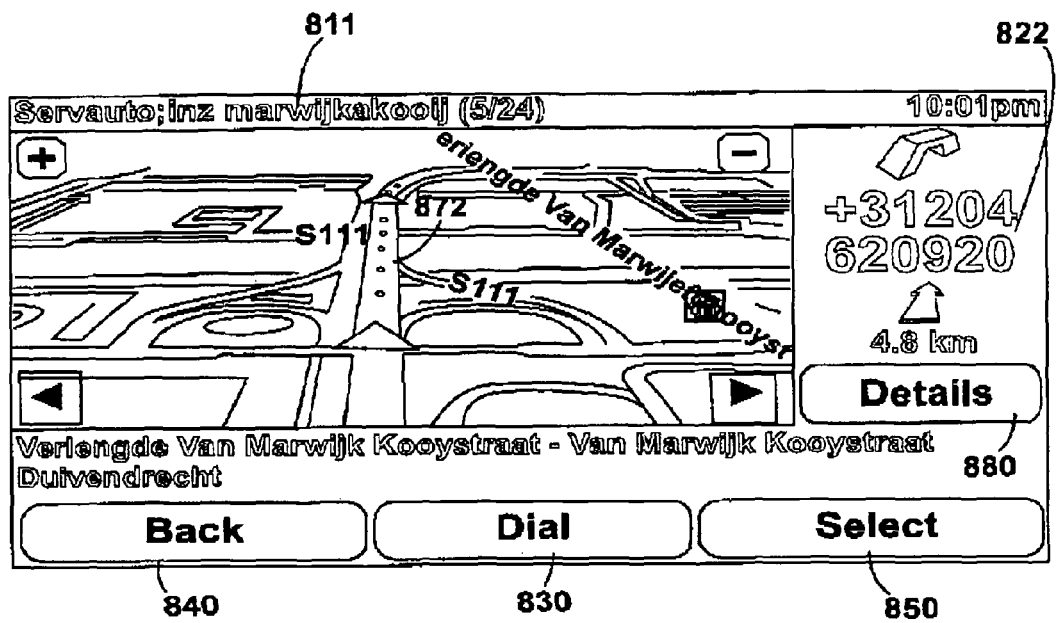
Figure 8C:
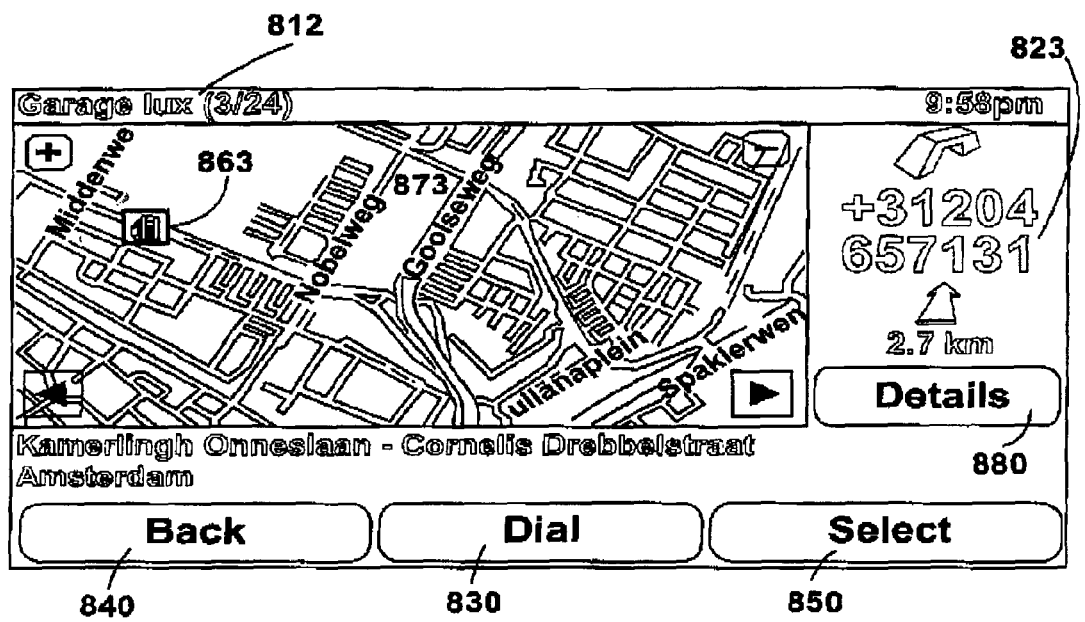

Examples an informational screen is shown in FIGS. 8A to 8C for example, and can include at least a name 810, 811, and 812 of FIGS. 8A to 8C for example; a phone number, 821, 822, and 823 of FIGS. 8A to 8C for example; and a prompt to dial the phone number of the selected Point of Interest entry, such as the "dial" prompt 830 in each of FIGS. 8A, 8B, and 8C. As such, the prompt to dial the phone number of the selected Point of Interest entry can include display of a selectable virtual key 830 displayed on the integrated input and display device 290 for example.

FIGS. 8A to 8C provide examples of displayable informational screens in connection with the present application. FIG. 8A displays an example informational screen for the initial Point of Interest entry of FIG. 7 entitled "Benzinestation slagboom b v," a gas station previously determined to be along the route of travel as indicated by arrow 700 of FIG. 7 for example. FIG. 8B provides an illustration of an example informational screen for the entry entitled "Servauto inz marwijk kooij," the fifth entry of FIG. 7, which was determined to be near the route of travel and accessible by merely a relatively small detour; and FIG. 8C provides an example of an informational screen for the third entry "Garage lux" of FIG. 7, which was determined to be near the route of travel, with a relatively large detour required.

As shown in FIGS. 8A to 8C, additional virtual keys 840 and 850 may also be displayed. Thus, in addition to the selectable virtual key 830 to dial the phone number, the displaying on the informational screen may further include display of at least two other virtual keys, one for formal selection of the selected Point of Interest entry after display of the informational screen (the "select" button key 850), and one for cancelling the display of the informational screen of the selected Point of Interest entry (the "back" key 840). Upon selection of the "back" key for example, in any one of FIGS. 8A to 8C, the display may return to that of FIG. 7 for example.

In addition, as shown in each of FIGS. 8A to 8C, the informational screen display may include an icon representing the location of the selected Point of Interest entry with map information, relative to a current route of travel of the navigation device 200. For example, as shown in FIGS. 8A to 8C, an icon 861 in FIG. 8A, 862 in FIG. 8B, and 863 in FIG. 8C may be displayed along with map information, representing a location of the Point of Interest relative to a current route of travel of the navigation device 200. Such a route of travel can be designated by elements 871 of FIG. 8A, 872 of FIG. 8B, and 873 of FIG. 8C for example. Again, this displaying can be dictated by the processor 210 directing display of both the route of travel 871, 872, and 873 and a location of a selected Point of Interest entry 861, 862, and 863, on the integrated input and display device 290 of the navigation device 200.

Figure 9:
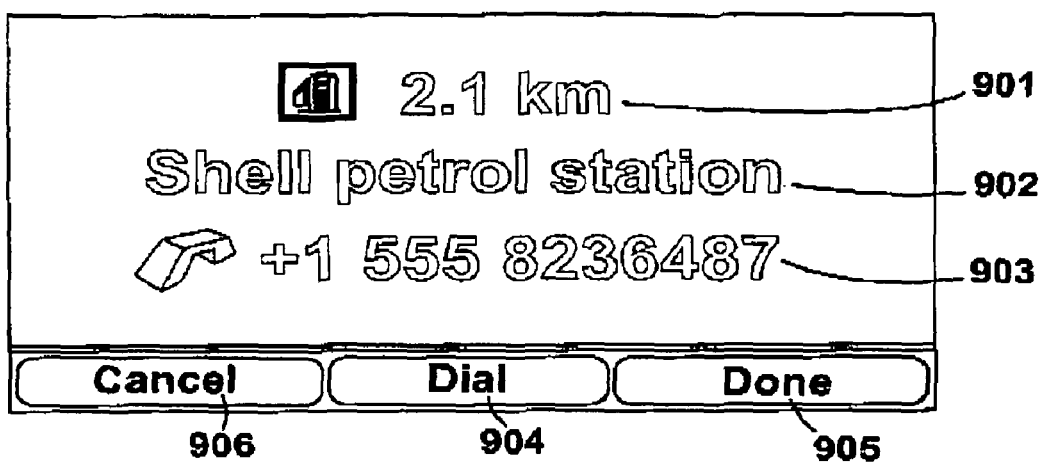

It should be noted that the informational screens shown in FIGS. 8A to 8C are merely examples of screens which may be displayed in connection with the present application, upon selecting of a particular Point of Interest entry. An alternative embodiment of a display screen is shown in FIG. 9 of the present application, wherein the display screen may merely display only a brief amount of information, identifying, for example, a distance and a phone number of the selected Point of Interest. This is shown by element 901 of FIG. 9 indicating that a gas station is 2.1 kilometers from a route of travel of the navigation device 200, a name "Shell petrol station" 902, and a phone number as indicated by element 903. Additionally, selectable virtual keys may be displayed to enable dialing a phone number, such as key 904 for example, as well as a key "done" 905 to actually select the Point of Interest entry, and the cancel key 906, acting somewhat similar to the "back" key 840 of FIGS. 8A to 8C for example. Again, many alternatives for the informational screen may be included without deviating from embodiments of the present application.

As shown in many of the FIGS. 8A to 8C and FIG. 9, inclusion of a selectable virtual key to dial a phone number, or inclusion of some type of prompt to dial the phone number of a selected Point of Interest entry, can be done if the navigation device 200 is currently paired with a mobile phone, or otherwise connected via a Bluetooth link for example. If the user of the navigation device 200 has his/her telephone (mobile phone for example, via a Bluetooth or other wireless connection) is paired with the navigation device 200, the navigation device 200 can automatically dial a phone number.

Figure 10A:
Figure 10B:
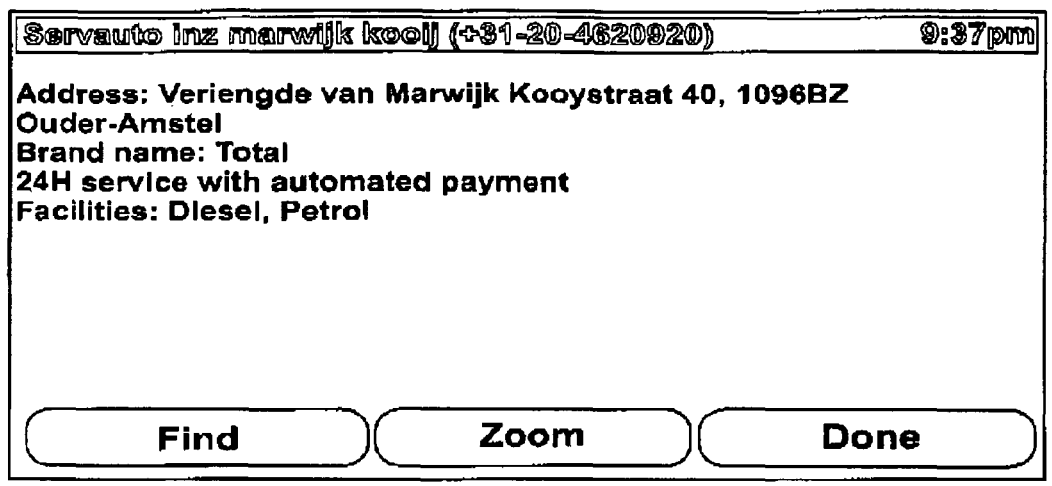
Figure 10C:
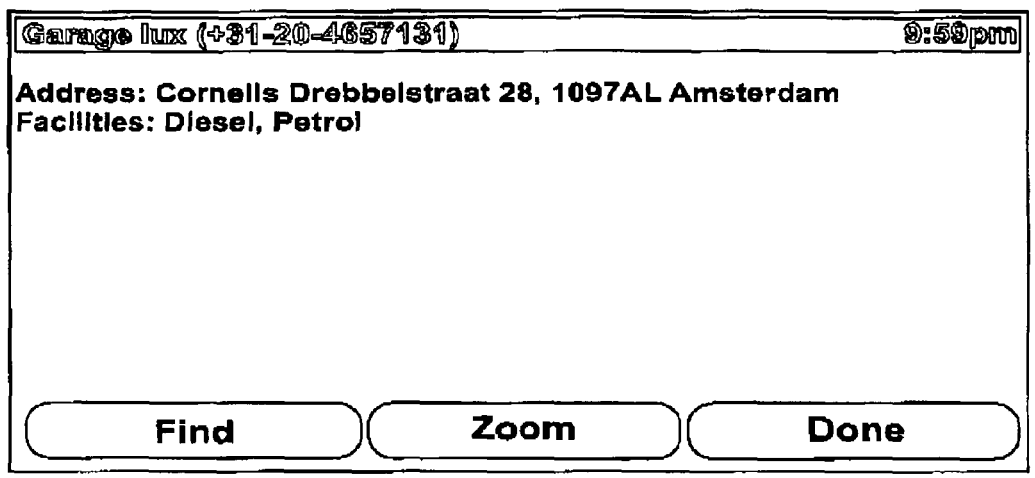

As shown in FIGS. 8A to 8C for example, the informational screen can further include another virtual key 880 entitled "details." Upon selection of this virtual key, additional information regarding the Point of Interest entry can be displayed in the form of, for example, "rich text" information. This rich text information can be displayed in a manner as shown in FIGS. 10A to 10C for example, and can include, among other things, additional information regarding the selected Point of Interest entries such as the actual address, the brand name of the Point of Interest entry, its hours of operation, and other aspects relating to its facilities. In the example shown in FIG. 10A, the gas station address is indicated, its brand name "bp" is indicated, the fact that it has 24 hour service is indicated, and it is further indicated that diesel, lpg, and petrol are available at the facility. This rich text information can be retrieved and later displayed via a rich text displayer as discussed in application Ser. No. 11/907,257, entitled A NAVIGATION DEVICE AND METHOD FOR DISPLAYING A RICH CONTENT DOCUMENT filed on even date herewith, the entire contents of which are hereby incorporated herein by reference.

Figure 11A:
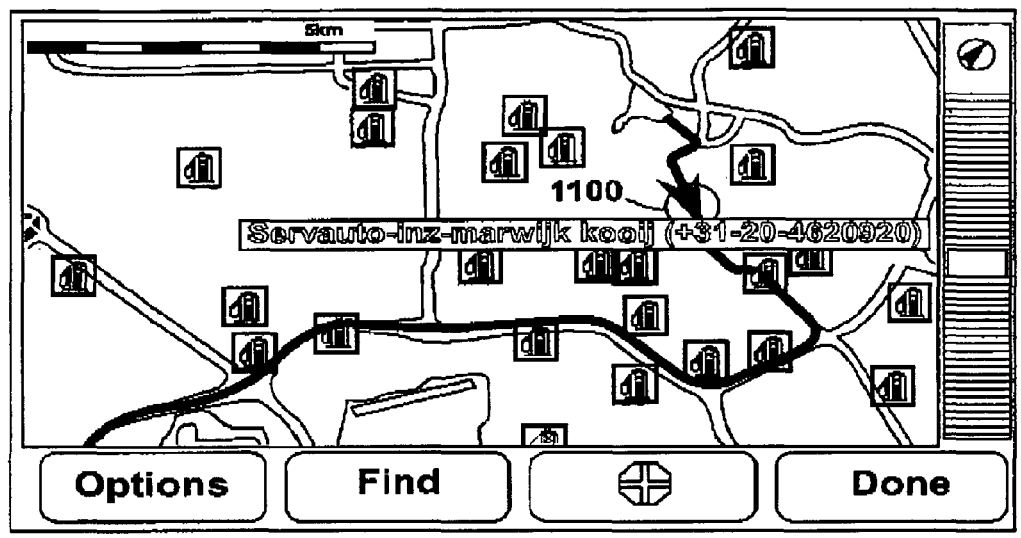
Figure 11B:
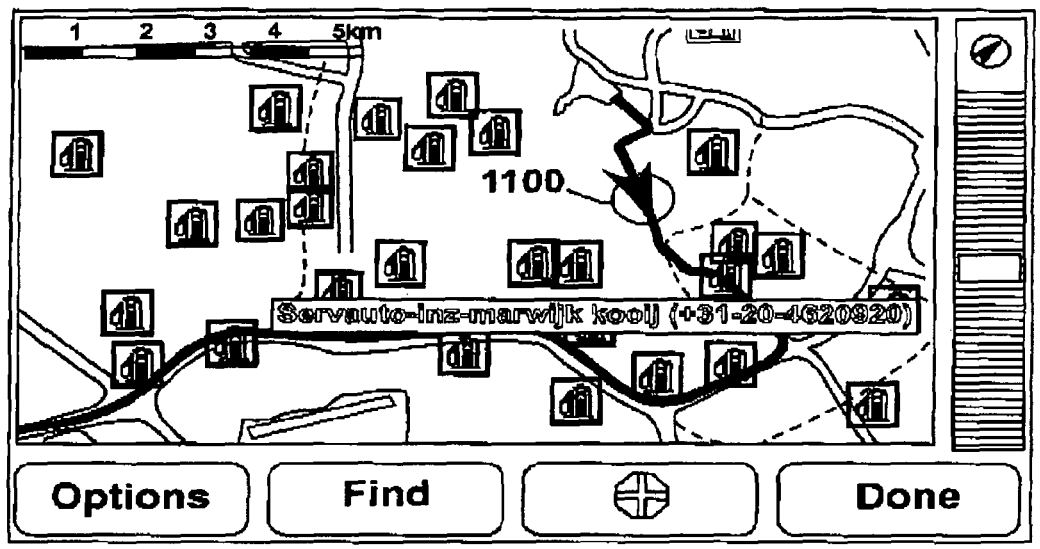

Alternatively, upon selection of the "details" button 880 displayed on the virtual screen of FIGS. 8A to 8C for example, a more detailed map can be displayed wherein the new detailed map can include, for example, a new route of travel 1100, 1110, and 1120. Thus, upon selection of the details button 880 of FIGS. 8A to 8C, or upon selection of any other particular button, the processor 210 of the navigation device 200 can calculate a new route of travel, including travel to the selected Point of Interest entry. This new route of travel 1100 of FIG. 11A, and 1110 of FIG. 11B can be displayed along with Illap information, along with other Points of Interest such as other gas stations for example, etc. Route of travel can be easily determined in a known manner, as the processor 210 merely reroutes the travel route so as to include the location of the Point of Interest entry.

Figure 11C:
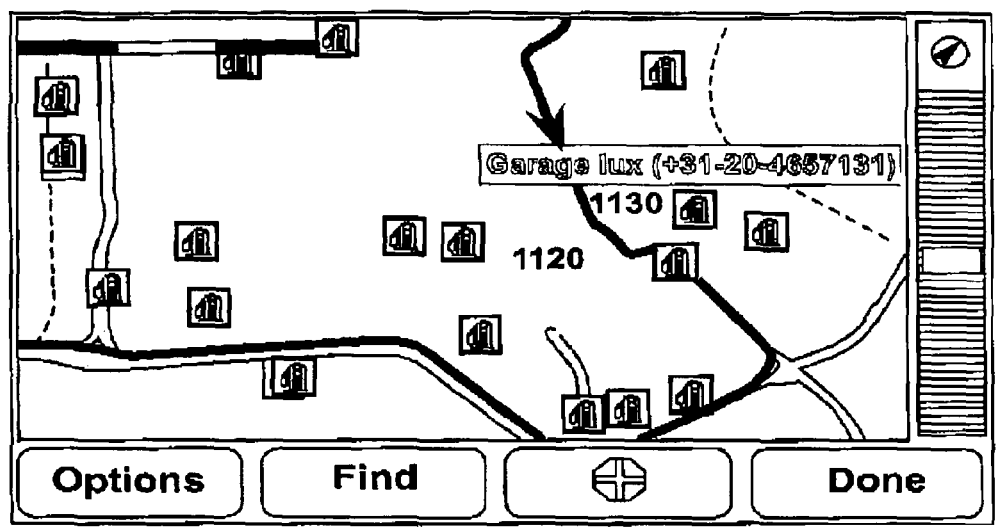

Alternatively, as shown with regard to FIG. 11C, a new route of travel 1120 can be determined near a Point of Interest entry, if the Point of Interest will require a significant rerouting for example. Thus, the route 1120 as shown in FIG. 11C merely goes near the "Garage lux" Point of Interest 1130, and does not correspond therewith. Again, other Points of Interest can be displayed, as well as a telephone number and/or name of the selected Point of Interest entry. Example options to plan a route to POI include, but are not limited to clicking on or otherwise selecting the POI, click a "navigate there" virtual button, select the POI via a "navigate to" button, etc.

It should be noted that the example embodiment of the present application as shown in FIGS. 5 to 11C was previously discussed with regard to gas station locations being the selected Point of Interest entry. However, the application is equally applicable to any type of Point of Interest wherein additional details of the rich text information can be displayed in association with a selected Point of Interest entry, along with other information such as the phone number, the virtual keys, etc., displayed on the informational screen of the selected Point of Interest entry. For example, the information displayed on the informational screen can include open hours for shops or churches, movie times for movie theaters, hours of operation for restaurants, detailed information regarding a particular church, restaurant, shop, etc. Thus, the present application should not be limited to Points of Interest which are gasoline stations for example.

It should be noted that each of the aforementioned aspects of an embodiment of the present application have been described with regard to the method of the present application. However, at least one embodiment of the present application is directed to a navigation device 200, including an integrated input and display device 290 to display a plurality of selectable point of interest icons; and a processor 210 to receive an indication of selection one of the icons, the integrated input and display device 290 being further useable to display a plurality of selectable point of interest entries in response to the processor 210 receiving an indication of selection one of the icons, and upon the processor 210 receiving an indication of selection of one of the point of interest entries, the integrated input and display device 290 being further useable to display an informational screen regarding the selected point of interest entry including at least a name and a phone number of the selected point of interest entry, along with a prompt to dial the phone number of the selected point of interest entry. Thus, such a navigation device 200 may be used to perform the various aspects of the method described with regard to FIGS. 5-11C, as would be understood by one of ordinary skill in the art. Thus, further explanation is omitted for the sake of brevity.

In at least one other embodiment of the present application, a method includes displaying a plurality of selectable point of interest entries on an integrated input and display device 290 of a navigation device 200; and displaying, upon receipt of an indication of a selection of one of the point of interest entries, an informational screen including display of a location of the selected point of interest entry relative to a current route of travel of the navigation device 200, at least a phone number of the selected point of interest entry, and a prompt to dial the phone number of the selected point of interest entry.

In at least one other embodiment of the present application, a device includes an integrated input and display device 290 to display a plurality of selectable point of interest entries; and a processor 210 to receive an indication of selection one of the point of interest entries, the integrated input and display device 290 being further useable to display, upon the receipt of an indication of a selection of one of the point of interest entries by the processor 210, an informational screen including display of a location of the selected point of interest entry relative to a current route of travel of the navigation device 200, at least a phone number of the selected point of interest entry, and a prompt to dial the phone number of the selected point of interest entry.

Figure 12:
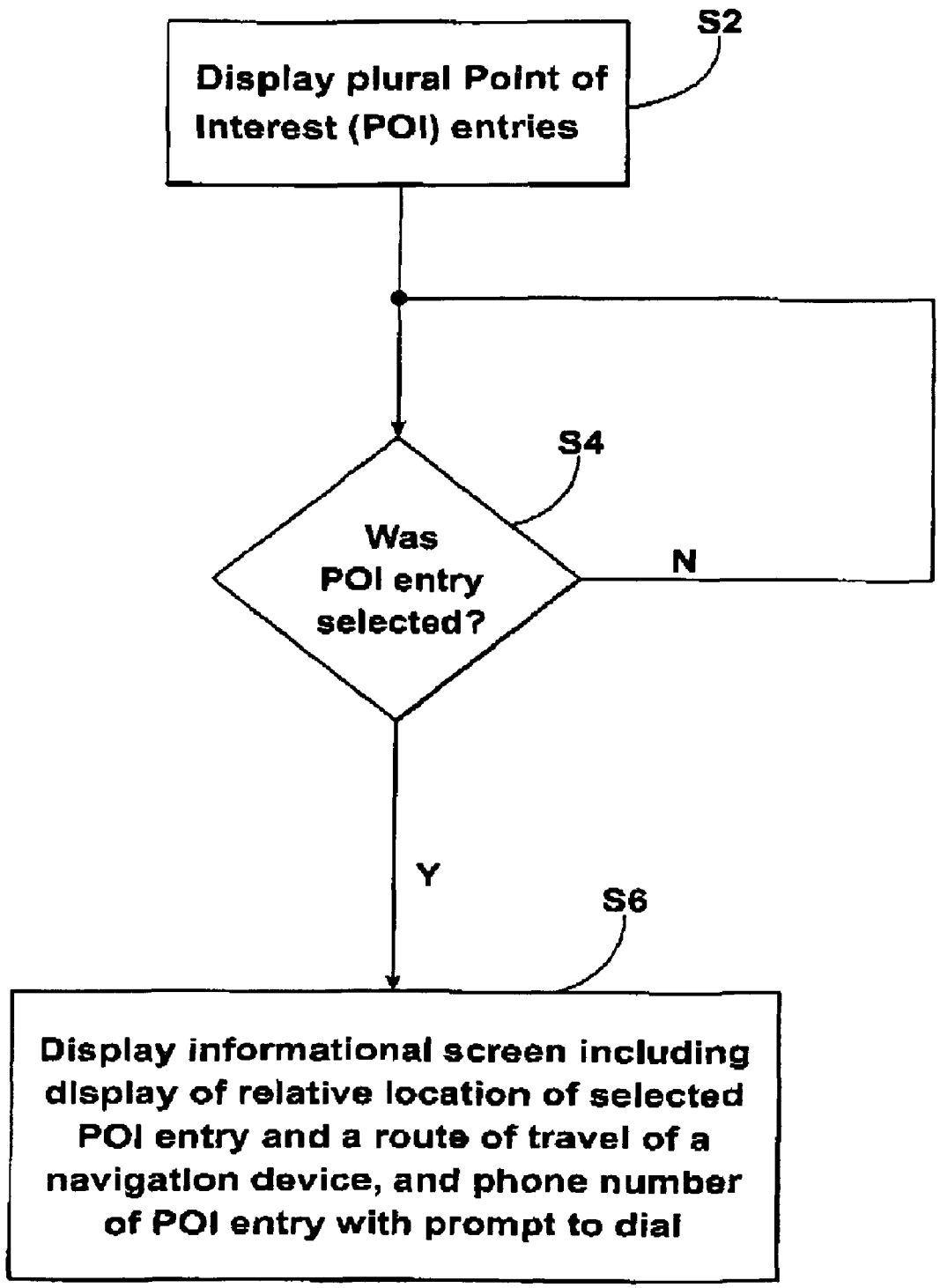
FIG. 12 illustrates a flow chart for another example embodiment of the present application.

FIG. 12 illustrates an alternative embodiment of the present application. In this embodiment, a plurality of Point of Interest entries are initially displayed in step S2 for selection on an integrated input and display device 290 of a navigation device 200 for example. Thereafter, in step S4, it is determined, by processor 210 for example, whether or not a Point of Interest entry was selected. If not, the system cycles back to repeat step S4, and if so, the system proceeds to step S6.

In step S6, upon receipt of an indication of a selection of one of the Point of Interest entries, by processor 210 for example in step S4, an informational screen is displayed including display of a relative location of the selected Point of Interest entry and a current route of travel of the navigation device 200, along with at least a phone number of the selected Point of Interest entry and a prompt to dial the phone number of the selected Point of Interest entry. An example informational screen is shown, for example, in FIGS. 8A to 8C. Thus, as the processor 210 has already determined a current route of travel of the navigation device 200 from map information stored in memory 230, input/selection of a travel destination and a current GPS location for example, it can direct the integrated input and display device 290 to display a location of a selected Point of Interest entry relative to a current route of travel of the navigation device 200, along with a phone number and a prompt to dial the phone number of the selected Point of Interest entry in a manner somewhat similar to that previously described.

Again, the prompt to dial the phone number can include display of a selectable virtual key such as that previously described, and the informational screen can include a display with map information, conveying a relative location of the selected Point of Interest entry and the current location of the navigation device 200 for example. Still further, the selectable Point of Interest entry can be displayed on the navigation device 200 in conjunction with a symbol representative of proximity to a current route of travel of the navigation device 200, wherein a displayed color of the symbol and/or shape of the symbol can be used to convey proximity to a current route of travel of the navigation device 200. Somewhat similar to that previously described, the informational screen can further include display of at least one further key for cancelling the display of the informational screen.

It should be noted that each of the aforementioned aspects of an embodiment of the present application have been described with regard to the method of the present application. However, at least one embodiment of the present application is directed to a navigation device 200, including an integrated input and display device 290 to display a plurality of selectable point of interest entries; and a processor 210 to receive an indication of selection one of the point of interest entries, the integrated input and display device 290 being further useable to display, upon the receipt of an indication of a selection of one of the point of interest entries by the processor 210, an informational screen including display of a location of the selected point of interest entry relative to a current route of travel of the navigation device 200, at least a phone number of the selected point of interest entry, and a prompt to dial the phone number of the selected point of interest entry. Thus, such a navigation device 200 may be used to perform the various aspects of the method described with regard to FIG. 12, as would be understood by one of ordinary skill in the art. Thus, further explanation is omitted for the sake of brevity.

The methods of at least one embodiment expressed above may be implemented as a computer data signal embodied in the carrier wave or propagated signal that represents a sequence of instructions which, when executed by a processor (such as processor 304 of server 302, and/or processor 210 of navigation device 200 for example) causes the processor to perform a respective method. In at least one other embodiment, at least one method provided above may be implemented above as a set of instructions contained on a computer readable or computer accessible medium, such as one of the memory devices previously described, for example, to perform the respective method when executed by a processor or other computer device. In varying embodiments, the medium may be a magnetic medium, electronic medium, optical medium, etc.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

As one of ordinary skill in the art will understand upon reading the disclosure, the electronic components of the navigation device 200 and/or the components of the server 302 can be embodied as computer hardware circuitry or as a computer readable program, or as a combination of both.

The system and method of embodiments of the present application include software operative on the processor to perform at least one of the methods according to the teachings of the present application. One of ordinary skill in the art will understand, upon reading and comprehending this disclosure, the manner in which a software program can be launched from a computer readable medium in a computer based system to execute the functions found in the software program. One of ordinary skill in the art will further understand the various programming languages which may be employed to create a software program designed to implement and perform at least one of the methods of the present application.

The programs can be structured in an object-orientation using an object-oriented language including but not limited to JAVA, Smalltalk, C++, etc., and the programs can be structured in a procedural-orientation using a procedural language including but not limited to COBAL, C, etc. The software components can communicate in any number of ways that are well known to those of ordinary skill in the art, including but not limited to by application of program interfaces (API), interprocess communication techniques, including but not limited to report procedure call (RPC), common object request broker architecture (CORBA), Component Object Model (COM), Distributed Component Object Model (DCOM), Distributed System Object Model (DSOM), and Remote Method Invocation (RMI). However, as will be appreciated by one of ordinary skill in the art upon reading the present application disclosure, the teachings of the present application are not limited to a particular programming language or environment.

The above systems, devices, and methods have been described by way of example and not by way of limitation with respect to improving accuracy, processor speed, and ease of user interaction, etc. with a navigation device 200.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method, comprising:
    determining a current route of travel for a navigation device;
    prompting selection of at least one of a plurality of point of interest icons on an integrated input and display device of the navigation device;
    searching for a plurality of selectable point of interest entries along or near the current route of travel in response to a selection of the at least one of the plurality of point of interest icons;
    displaying the plurality of selectable point of interest entries on the navigation device in response to a selection of the at least one of the plurality of point of interest icons; and
    displaying, upon receipt of an indication of a selection of one of the plurality of selectable point of interest entries, information regarding the selected point of interest entry of the plurality of selectable point of interest entries,
    wherein the plurality of the displayed selectable point of interest entries displayed are each qualified by a total distance, the total distance of each one of the respective plurality of selectable point of interest entries being estimated from a current location of the navigation device and a location of each respective one of the plurality of the selectable point of interest entries, each respective total distance including at least a route distance along the current route of travel to a route position relatively closest to each respective one of the plurality of selectable point of interest entries,
    wherein the displaying information regarding the selected point of interest entry displays on an informational screen a phone number of the selected point of interest entry and a prompt to dial the phone number of the selected point of interest entry,
    wherein the prompt to dial the phone number of the selected point of interest entry includes a display of a selectable virtual key on the integrated input and display device of the navigation device, and
    wherein the prompt to dial the phone number of the selected point of interest entry on the informational screen further includes a display of a virtual key for formal selection of the selected point of interest after display of the informational screen and a virtual key for cancelling the display of the informational screen of the selected point of interest entry.

2. A non-transitory computer readable medium including program segments for, when executed on a processor of a navigation device, causing the navigation device to implement the method of claim 1.

3. The method of claim 1, wherein the total distance of at least one of the plurality of selectable point of interest entries further includes a potential distance estimated from the route position relatively closest to the at least one of the plurality of selectable point of interest entries and the location of the at least one of the plurality of selectable point of interest entries.

4. A navigation device comprising:
    a processor configured to determine a current route of travel;
    an integrated input and display device configured to prompt selection of at least one of a plurality of point of interest icons, wherein a selection of at least one of plurality of point of interest icons initiates a search for a plurality of selectable point of interest entries along or near the current route of travel, the integrated input and display device further configured to display the plurality of selectable point of interest entries in response to a selection of the at least one of the plurality of point of interest icons, and the integrated input and display device being further configured to display, upon receipt of an indication of a selection of one of the plurality of selectable point of interest entries, information regarding the selected point of interest entry of the plurality of selectable point of interest entries, wherein the plurality of selectable point of interest entries displayed on the integrated input and display device are each qualified by a total distance, the total distance of each one of the respective plurality of selectable point of interest entries being estimated from a current location of the navigation device and a location of each respective one of the plurality of the selectable point of interest entries, each respective total distance including at least a route distance along the current route of travel to a route position relatively closest to each respective one of the plurality of selectable point of interest entries, wherein the displayed information regarding the selected point of interest entry is displayed on an informational screen, the informational screen including a phone number of the selected point of interest entry and a prompt to dial the phone number of the selected point of interest entry, wherein the prompt to dial the phone number of the selected point of interest entry on the integrated input and display device includes a display of a selectable virtual key, and wherein the prompt to dial the phone number of the selected point of interest entry on the informational screen further includes a display of a virtual key for formal selection of the selected point of interest after display of the informational screen and a virtual key for cancelling the display of the information screen of the selected point of interest entry.

5. The navigation device of claim 4, wherein the total distance of at least one of the plurality of selectable point of interest entries further includes a potential distance estimated from the route position relatively closest to the at least one of the plurality of selectable point of interest entries and the location of the at least one of the plurality of selectable point of interest entries.

6. The method of claim 1, wherein the selectable point of interest entries are displayed on the navigation device in conjunction with a symbol representative of proximity to the current route of travel of the navigation device.

7. The method of claim 6, wherein a displayed color of the symbol is used to convey proximity to the current route of travel of the navigation device.

8. The method of claim 6, wherein a displayed shape of the symbol is used to convey proximity to the current route of travel of the navigation device.

9. The method of claim 1, wherein the displaying information regarding the selected point of interest entry further displays on the informational screen at least one of a name of the selected point of interest entry, and an icon representing map data of the selected point of interest.

10. The navigation device of claim 4, wherein the selectable point of interest entries are displayed on the navigation device in conjunction with a symbol representative of proximity to the current route of travel of the navigation device.

11. The navigation device of claim 10, wherein a displayed color of the symbol is used to convey proximity to the current route of travel of the navigation device.

12. The navigation device of claim 10, wherein a displayed shape of the symbol is used to convey proximity to the current route of travel of the navigation device.

13. The navigation device of claim 4, wherein the informational screen further includes at least one of a name of the selected point of interest entry, and an icon representing map data of the selected point of interest.

* * * * *